Patented Sept. 3, 1940

2,213,218

UNITED STATES PATENT OFFICE 2,213,218

INSECTICIDE

William F. Hester, Drexel Hill, Pa., assignor to Röhm & Haas Company, Philadelphia, Pa.

No Drawing. Application April 19, 1939, Serial No. 268,695

5 Claims. (Cl. 167—30)

This invention relates to insecticidal compositions and particularly to the use of certain substituted phenyl benzyl ethers and thio ethers as the active principle thereof. It is a continuation-in-part of copending application, Serial No. 141,927, filed May 11, 1937, now U. S. Patent No. 2,159,025, granted May 23, 1939.

The object of the invention is to provide improved insecticidal compositions of general application which can be used in low concentration to control pests without injury to plant foliage. A further object is to provide an organic insecticide of the so-called stomach type to be used in place of lead arsenate, etc., against chewing insects such as bean beetles, etc.

A still further object relating to and growing out of the accomplishing of the foregoing objects is to provide an efficient method for the preparation of phenyl benzyl ethers in high yields.

The phenyl ethers and benzyl ethers have heretofore been proposed as insecticidal principles. However, they have never been used extensively for the purpose because of their relatively low toxicity as compared to other known insecticidal principles and because of the severe plant injury that results from their use in sufficient quantities to be effective against insects. It has now been found, however, that the introduction of certain substituents into either the phenyl or benzyl group has the effect of greatly reducing the corrosiveness of phenyl benzyl ethers to plant foliage, while in many instances increasing the toxicity of the base compound. By a series of many hundred tests on phenyl benzyl ethers having various substituents in the phenyl and/or benzyl nucleus, it has been established that substituents having an atomic or relative group weight of at least 30 and which are not themselves corrosive, such as strongly acid or basic groups and the phenolic hydroxyl group, either greatly reduce plant foliage injury as compared with equal proportions of the unsubstituted compound or so greatly increase the toxicity that by using smaller dosages, plant injury can be avoided while maintaining effective insect control. Substituents of a total relative weight less than 30 are apparently too small to be effective.

Among the substituent groups that have been found to produce this effect may be mentioned the alkyl groups of more than 2 carbon atoms, the alkylene groups of similar carbon content, hydroaromatic groups, aralkyl groups, alkoxy groups, aryloxy groups, acyl groups, halogen atoms, nitro groups, amino groups that have been neutralized, acylamino, alkylamino and aralkylamino groups, and carboxyl and sulfonic groups that have been neutralized as by being converted to a salt, ester, or lactone group. It has also been found that when the single aromatic ring of either the benzyl or phenyl group is replaced with a polynuclear aromatic group such as the naphthyl radical, the second ring produces the effect of a substituent group. Such polynuclear groups are accordingly hereinafter considered as substituted phenyl groups. The substituent group may be in either the ortho, meta, or para position to the —CH$_2$O— linkage but preferably is in the para where its influence in stomach poisons is generally the greatest. In compounds to be used solely as contact insecticides, the substituent in the ortho position is preferred. A plurality of substituents either similar or dissimilar and either situated on the one or on both aromatic rings, is included. Compounds with substituents in the methylene group are also included.

These compounds may be made in any of the known methods all of which in principle involve condensing in an alkaline medium the properly substituted phenyl with benzyl chloride containing the desired substituents, if any, in the benzyl group. An improved method that has been found particularly satisfactory and which is a feature of this invention is the utilization of dimethylaniline in amounts substantially less than equimolecular with the benzyl chloride in conjunction with an alkali metal hydroxide as the condensing agent. In general this improved method comprises mixing the phenol or the sodium salt of the phenol being condensed, a slight molar excess of the benzyl chloride, dimethylaniline in amounts approximately one-half the molar quantity of the phenol or benzyl chloride, and an amount of alkali metal hydroxide equivalent to the amount of benzyl chloride in aqueous emulsion, heating until reaction is substantially complete, filtering, and washing, and recrystallizing or otherwise purifying the product. The proportions here given are not critical but rather are those that have been found to give in general the most economical yields. Larger or smaller amounts of dimethylaniline may be used. The following examples are given to illustrate this method of preparation, wide variations in them being permissible.

EXAMPLE 1.—*Preparation of $C_6H_5CH_2OC_6H_4$-$NO_2$-4.*—A mixture of 3360 g. (14 mols) of 81.8% paranitro-sodium phenolate dihydrate, 2050 g. (15.4 mols) of benzyl chloride, 848 g. (7 mols) of dimethylaniline, 56 g. (1.4 mol) of sodium hydroxide in 10 l. of water, was heated on a boiling water bath for 6 hours, with stirring. It was allowed to stand overnight, and then was filtered. The filtrate was neutral to litmus. The cake was ground and washed with 609 cc. (7 mols) of concentrated hydrochloric acid in 3 l. of water, and then with 400 cc. (4.7 mols) of acid in 10 l. of water. The solid was washed twice with 2 l. of methanol, once with 3 l. of petroleum ether (B. P. 60–100° C.) and then recrystallized from isopropanol, using 300 cc. for each 50 g. of solid. The recrystallized product was 2718 g., 82% yield, M. P. 105–6°, which agrees with the melting point recorded in the literature. When the dimethylaniline was replaced with sodium hydroxide the yield dropped to 46%.

EXAMPLE 2.—Preparation of $C_6H_5CH_2OC_6H_4$-$C_6H_5$-2.—A mixture of 2040 g. (12 mols) of o-phenylphenol, 1670 g. (13.2 mols) of benzyl chloride, 530 g. (13.2 mols) of sodium hydroxide, 727 g. (6 mols) of dimethylaniline, in 10 l. of water, was heated to 100° C. and stirred at this temperature for 4 hours. The mixture was allowed to cool overnight and the top aqueous layer was siphoned off. A mixture of 3.5 l. of ethylene dichloride and 3.5 l. of water containing 50 g. of sodium hydroxide was added to the bottom layer, and after stirring, allowed to separate. The bottom layer was washed with 7 l. of water and then three times with 520 cc. (6 mols) of concentrated hydrochloric acid in 3.5 l. of water. The bottom layer was washed three times with 7 l. of water. The ethylene dichloride solution was dried over calcium chloride, concentrated, dissolved in 6.3 l. of methanol, and cooled to 0°. The crystalline product was filtered off and air-dried. The total weight was 2880 g., or 92.3% of the theoretical yield. Melting point 42–3° C. When 363 g. (3 mols) or 0.25 molecular equivalents of dimethylaniline was used, the yield was only 79%.

EXAMPLE 3.—Preparation of $C_6H_5CH_2OC_6H_4$-$C(CH_3)_3$-4.—A mixture of 150 g. (1 mol) of p-tertiary-butylphenol, 62 g. (0.5 mol) of dimethylaniline, 139 g. (1.1 mol) of benzyl chloride, 44 g. (1.1 mol) of sodium hydroxide in 540 cc. of water, was stirred and heated on a boiling water bath for 4 hours. The mixture was rapidly cooled and to it was added 50 cc. (0.5 mol) of concentrated hydrochloric acid. The solid was washed twice by melting in the presence of 0.5 mol of hydrochloric acid in 700 cc. of water, and then washed twice with water. It was recrystallized from 350 cc. of methanol, giving 200 g. or 83% yield. Melting point 64° C.

EXAMPLE 4.—Preparation of 4-$NO_2C_6H_4CH_2$-$OC_6H_4C(CH_3)_3$-4.—Crude p-nitrobenzyl bromide was prepared by the method of Org. Syn. XVI., 54.

A mixture of 400 g. of this crude material (1.33 mol), 200 g. (1.33 mol) of p-tertiary butylphenol, 60 g. (1.5 mol) of sodium hydroxide in 1 l. of water, was heated on a boiling water bath and stirred for 4 hours. After cooling overnight, the resulting solid was transferred to a Büchner funnel and washed with 100 cc. of 50% methanol and with 100 cc. of 75% methanol. A small amount of black oil filtered through. The product was then recrystallized from 800 cc. of methanol twice, as light tan crystals melting at 80°. The yield of 4'-nitrobenzyl 4-tertiary-butyl phenyl ether was 311 g., or 82%.

The phenyl benzyl ethers, having a substituent comprising a neutralized acidic group, may be represented by the following general formula

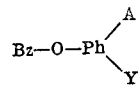

wherein Bz represents a benzyl group, Ph represents a phenyl nucleus, Y represents a member of the group consisting of hydrogen, aliphatic hydrocarbon groups, and nitro groups, and A represents a neutral substituent selected from the group consisting of salts, esters, and amides of the —COOH and —$SO_3H$ groups.

The best method of using these phenyl benzyl ethers in insecticidal compositions will depend to a large extent on the particular insect or class of insects which is being combated. When used to control chewing insects such as the bean beetle they may be applied as either a dust or a spray in which the active ingredient varies from 0.05 to 5% of the total. The dusts are readily prepared by dissolving the ether in a suitable solvent such as acetone, mixing the proper amount of solution with an inert powdered substance such as talc, lime, etc., and drying while stirring the powder. Suitable formulae are the following—

| | Parts by weight |
|---|---|
| (a) Active ingredient | 1 |
| Talc or lime | 98 |
| Spreader (cetyl dimethyl, ethyl ammonium, ethyl sulfate) | 1 |
| (b) Active ingredient | 1 |
| Alum sludge | 48 |
| Lime | 48 |
| Soy bean oil | 3 |

Sprays to combat chewing insects can be made by applying a larger quantity of the active ingredient to a powder adding an emulsifying agent and dispersing in sufficient water to reduce the quantity of active ingredient in the final spray to the desired concentration. A suitable formula for this type of spray is—

| | Parts |
|---|---|
| 1 part active ingredient deposited on 2 parts magnesium carbonate | 3 |
| A commercial emulsifying agent sold under the name DX spreader | 0.5 |
| Water | 96.5 |

Sprays used to repel sucking insects such as red spiders by contact can be made by dissolving the active ingredient in an organic liquid that does not affect the foliage, adding an emulsifying agent, and dispersing the solution in sufficient water to reduce the concentration of active ingredient to the desired point. A suitable formula for this type of spray is—

| | Parts |
|---|---|
| .25 part active ingredient and .25 part emulsifying agent dissolved in .50 part pine oil | 1 |
| Water | 100–300 |

Spray used to combat flying insects such as common flies, mosquitoes, etc., can be made by merely dissolving the proper amount of active ingredient, 1–5%, in an organic solvent such as kerosene to which a spreading agent may be added if desired.

The tables given below show the results of a number of tests using variously substituted phenyl benzyl ethers in combating the more common insects. There is also included for purposes of comparison the results obtained when the unsubstituted compound is used.

Table I gives the results of toxicity tests of 1% dusts or sprays against bean beetle larvae. These tests were made under controlled temperature, humidity and light conditions. The bean plants were sprayed or dusted 24 hours before the Mexican bean beetle larvae were introduced. Counts were made at the end of 96 hours. At least three experiments were run on each compound and the figures given are the average. Checks were made in each case with magnesium arsenate.

Table I

| Formula | Plant inj. | Kill, percent | Incap., percent | Mg. arsenate Kill, percent | Mg. arsenate Incap., percent |
|---|---|---|---|---|---|
| $C_6H_5CH_2OC_6H_5$ | Severe | 13 | 6 | 40 | 3 |
| $C_6H_5CH_2OC_6H_4C(CH_3)_3$-4 | No | 76 | 10 | 40 | 3 |
| $C_6H_5CH_2OC_6H_4C(CH_3)_2C_2H_5$-4 | No | 80 | 13 | 40 | 3 |
| $C_6H_5CH_2OC_6H_4CH(CH_3)_2$-4 | No | 73 | 13 | 40 | 3 |
| $C_6H_5CH_2OC_6H_4C_6H_5$-2 | No | 46 | 23 | 43 | 23 |
| $C_6H_5CH_2OC_6H_4Cl$-4 | Slight | 60 | 16 | 43 | 23 |
| $C_6H_5CH_2OC_6H_4NO_2$-4 | No | 83 | 10 | 40 | 3 |
| $C_6H_5CH_2OC_6H_2(-2,6-(NO_2)_2-4-C(CH_3)_2CH_2C(CH_3)_3$ | No | 53 | 10 | 35 | 13 |
| $C_6H_5CH_2OC_6H_3CH_3$-2-$NO_2$-4 | No | 60 | 30 | 30 | 6 |
| $C_6H_5CH_2OC_6H_4COC_6H_5$-4 | Slight | 73 | 23 | 30 | 6 |
| $C_6H_5CH_2OC_6H_3(-2-NO_2)SO_3NH_3C_6H_4Cl$-4 | Slight | 16 | 23 | 30 | 6 |
| 4-$NO_2C_6H_4CH_2OC_6H_4C(CH_3)_3$-4 | No | 93 | 3 | 35 | 13 |
| 4-$NO_2C_6H_4CH_2OC_6H_4CH_3$-4 | Slight | 66 | --- | 35 | 13 |
| 1-$C_{10}H_7CH_2OC_6H_5$ | No | 30 | 23 | 30 | 6 |
| $(C_6H_5)_2CHOC_6H_5$ | No | 10 | 20 | 35 | 13 |

Table II gives the results of a similar series of tests performed on bean beetle adults. These tests were made under the same conditions given for Table I excepting that the bean beetle adults were used instead of the larvae.

In the foregoing tables the tests summarized used the substituted phenyl benzyl ethers as stomach poisons. The tables that follow show the results of tests in which they are used as contact poisons. Table IV shows their toxicity

Table II

| Formula | Plant inj. | Kill, percent | Incap., percent | Mg arsenate Kill, percent | Mg arsenate Incap., percent |
|---|---|---|---|---|---|
| $C_6H_5CH_2OC_6H_5$ | Severe | 15 | --- | 20 | --- |
| $C_6H_5CH_2OC_6H_4CH_3$-4 | Fatal | 13 | 3 | 23 | --- |
| $C_6H_5CH_2OC_6H_4CH_3$-3 | Fatal | 10 | --- | 25 | --- |
| $C_6H_5CH_2OC_6H_4C(CH_3)_3$-4 | No | 20 | 6 | 15 | --- |
| $C_6H_5CH_2OC_6H_4C(CH_3)_2CH_2CH_3$-4 | No | 43 | 3 | 15 | --- |
| $C_6H_5CH_2OC_6H_4C(CH_3)_2CH_2C(CH_3)_3$-4 | No | 13 | 0 | 20 | --- |
| $C_6H_5CH_2OC_6H_4COCH_3$-4 | Slight | 10 | 10 | 16 | --- |
| $C_6H_5CH_2OC_6H_4C_2H_5$-2 | No | 20 | 10 | 16 | --- |
| $C_6H_5CH_2OC_6H_4Cl$-4 | Slight | 43 | 6 | 16 | --- |
| $C_6H_5CH_2OC_6H_4NO_2$-4 | No | 30 | 10 | 16 | --- |
| $C_6H_5CH_2OC_6H_4NO_2$-2 | Slight | 23 | 3 | 16 | --- |
| $C_6H_5CH_2OC_{10}H_7$-1 | Slight | 16 | 10 | 16 | --- |
| $C_6H_5CH_2OC_{10}H_7$-2 | No | 16 | 3 | 16 | --- |
| 1,3-$(C_6H_5CH_2O)_2C_6H_4$ | No | 13 | 0 | 16 | --- |
| $(C_6H_5CH_2OC_6H_4-)_2C(CH_3)_2$ | No | 15 | 0 | 10 | --- |
| $C_6H_5CH_2OC_6H_3NO_2$-2-$Cl$-4 | No | 23 | 13 | 16 | --- |
| $C_6H_5CH_2SC_6H_4NO_2$-4 | No | 26 | 6 | 16 | --- |
| $C_6H_5CH_2SC_6H_3(NO_2)_2$-2,4 | No | 10 | 0 | 10 | --- |
| $C_6H_5CH_2OC_6H_4NHCOCH_3$-4 | No | 20 | 16 | 16 | --- |
| $C_6H_5CH_2OC_6H_4COOZn_{1/2}$-2 | Slight | 20 | 5 | 10 | --- |
| $C_6H_5CH_2OC_6H_4SO_3NH_3C_6H_4CH_3$-4 | No | 13 | 0 | 16 | --- |
| 4-$NO_2C_6H_4CH_2OC_6H_5$ | No | 36 | 6 | 10 | --- |
| 4-$NO_2C_6H_4CH_2OC_6H_4NO_2$-2 | No | 16 | 3 | 13 | --- |
| 4-$NO_2C_6H_4CH_2OC_6H_4Cl$-4 | No | 30 | 13 | 13 | --- |
| 4-$NO_2C_6H_4CH_2OC_6H_4C_6H_5$-2 | No | 16 | 0 | 26 | --- |
| 2-$ClC_6H_4CH_2OC_6H_4C(CH_3)_2CH_2C(CH_3)_3$-4 | No | 13 | 0 | 33 | 3 |
| 2-$ClC_6H_4CH_2OC_6H_4NO_2$-4 | No | 55 | 15 | 30 | 5 |
| 2-$ClC_6H_4CH_2OC_6H_4Cl$-4 | No | 50 | 5 | 25 | 5 |
| 2-$ClC_6H_4CH_2OC_6H_4C_6H_5$-2 | No | 30 | 6 | 30 | 3 |
| 3-$NO_2$-4-$CH_3OC_6H_2CH_2OC_6H_5$ | No | 20 | 13 | 30 | 3 |
| 1-$C_{10}H_7CH_2OC_6H_4Cl$-4 | No | 35 | 10 | 25 | 5 |
| 1-$C_{10}H_7CH_2OC_6H_4C_6H_5$-2 | No | 30 | 10 | 30 | 3 |
| 2-$C_{10}H_{11}CH_2OC_6H_4C(CH_3)_3$-4 | Slight | 30 | 0 | 36 | 3 |
| 2-$C_{10}H_{11}CH_2OC_6H_4C(CH_3)_2CH_2C(CH_3)_3$-4 | No | 26 | 3 | 36 | 3 |
| 2-$C_{10}H_{11}CH_2OC_6H_4C_6H_5$-2 | No | 20 | 5 | 35 | 5 |

Table III shows the effectiveness of the new insecticides agains cabbage worm larvae. The procedure was the same as for Tables I and II except the test organism was the larva of the diamond-back cabbage worm.

against red spiders. In all these tests the insecticide was applied as an emulsion spray in which the toxic material being tested was diluted 1:1200 times unless otherwise indicated. At this dilution no foliage injury was observed with any

Table III

| Formula | Plant inj. | Percent kill | Mg arsenate Percent kill | Mg arsenate Incap. |
|---|---|---|---|---|
| $C_6H_5CH_2OC_6H_5$ | Severe | 70 | 23 | --- |
| $C_6H_5CH_2OC_6H_4C(CH_3)_3$-4 | No | 100 | 23 | --- |
| $C_6H_5CH_2OC_6H_4C(CH_3)_2C_2H_5$-4 | No | 90 | 23 | --- |
| $C_6H_5CH_2OC_6H_4C_6H_5$-2 | No | 77 | 23 | --- |
| $C_6H_5CH_2OC_6H_4Cl$-4 | Slight | 83 | 23 | --- |
| $C_6H_5CH_2OC_6H_4NO_2$-4 | No | 43 | 23 | --- |
| $C_6H_5CH_2OC_6H_2(NO_2)_2$-2,6-$C(CH_3)_2CH_2C(CH_3)_3$ | No | 93 | *90 | 3 |
| 4-$NO_2C_6H_4CH_2OC_6H_4C(CH_3)_3$-4 | No | 53 | *90 | 3 |

*Lead arsenate used in check in place of magnesium arsenate.

of the materials tested. The tests were made by spraying the emulsion under standard conditions on foliage infested with red spiders (Araneida). The host plants were ageratum, bean, and cabbage. The plants were allowed to stand for 24 hours and then counts were made on five pieces of the plant for each test. The figures given are the average percent kill.

Table IV

| Formula | Percent kill |
|---|---|
| $C_6H_5CH_2OC_6H_5$ | 26 |
| $C_6H_5CH_2OC_6H_4CH_3$-3 | 41 |
| $C_6H_5CH_2OC_6H_3(CH_3)_2$ | 96 |
| $C_6H_5CH_2OC_6H_3$-3-$CH_3$-6-$CH(CH_3)_2$ | 83 |
| $C_6H_5CH_2OC_6H_4CH(CH_3)C_2H_5$-4 | 82 |
| $C_6H_5CH_2OC_6H_4C(CH_3)_3$-4 | 83 |
| $C_6H_5CH_2OC_6H_4C(CH_3)_2C_2H_5$-4 | 57 |
| $C_6H_5CH_2OC_6H_4OCH_3$-2 | 57 |
| $C_6H_5CH_2OC_6H_4CH_2CH=CH_2$-2 | 60 |
| $C_6H_5CH_2OC_6H_4COCH_3$-2 | 81 |
| $C_6H_5CH_2OC_6H_4C_6H_5$-2 | 91 |
| $C_6H_5CH_2OC_6H_4Cl$-2 | 83 |
| $C_6H_5CH_2OC_6H_4NO_2$-2 (dilution 1:800) | 60 |
| $C_6H_5CH_2OC_6H_2(NO_2)_2$-2,6-$C(CH_3)_2CH_2C(CH_3)_3$-4 | 64 |
| $C_6H_5CH_2OC_{10}H_7$-1 | 82 |
| 1,3-($C_6H_5CH_2O)_2C_6H_4$ | 51 |
| $C_6H_5CH_2OC_6H_3NO_2$-2-Cl-4 | 81 |
| $C_6H_5CH_2SC_6H_4NO_2$-4 | 53 |
| $C_6H_5CH_2OC_6H_4CO_2CH_3$-2 | 88 |
| $C_6H_5CH_2OC_6H_4CO_2CH_2CH_2SCN$-2 | 52 |
| $C_6H_5CH_2O$-[structure] | 69 |
| 4-$NO_2C_6H_4CH_2OC_6H_5$ | 54 |
| 4-$NO_2C_6H_4CH_2OC_6H_4C(CH_3)_3$-4 | 66 |
| 4-$NO_2C_6H_4CH_2OC_6H_4CH_3$-3 | 94 |
| 4-$NO_2C_6H_4CH_2OC_6H_4Cl$-4 | 62 |
| 2-$ClC_6H_4CH_2OC_6H_4C_6H_5$-2 | 97 |
| 1-$C_{10}H_7CH_2OC_6H_4NO_2$-4 | 72 |
| 1-$C_{10}H_7CH_2OC_6H_4C_6H_5$-2 | 53 |
| 2-$C_{10}H_{11}CH_2OC_6H_5$ | 57 |
| 2-$C_{10}H_{11}CH_2OC_6H_4C(CH_3)_3$-4 | 91 |
| 2-$C_{10}H_{11}CH_2OC_6H_4C_6H_5$-2 | 51 |
| $(C_6H_5)_2C(OC_2H_5)OC_6H_4Cl$-4 | 56 |

Table V summarizes similar tests against mealy bugs. The tests were conducted in the same manner as in Table IV excepting that the organisms were mealy bugs and the host plant coleus.

Table V

| Formula | Percent kill |
|---|---|
| $C_6H_5CH_2OC_6H_5$ | 12 |
| $C_6H_5CH_2OC_6H_4CH_3$-3 | 17 |
| $C_6H_5CH_2OC_6H_4CH_3$-2 | 18 |
| $C_6H_5CH_2OC_6H_3(CH_3)_2$ | 53 |
| $C_6H_5CH_2OC_6H_3$-3-$CH(CH_3)_2$-6 | 71 |
| $C_6H_5CH_2OC_6H_4CH(CH_3)C_2H_5$-4 | 55 |
| $C_6H_5CH_2OC_6H_4C(CH_3)_3$-4 | 51 |
| $C_6H_5CH_2OC_6H_4C(CH_3)_2CH_2C(CH_3)_3$-4 | 57 |
| $C_6H_5CH_2OC_6H_4OCH_3$-2 | 91 |
| $C_6H_5CH_2OC_6H_4CH_2CH=CH_2$-2 | 58 |
| $C_6H_5CH_2OC_6H_4COCH_3$-4 | 54 |
| $C_6H_5CH_2OC_6H_4C_6H_5$-2 | 56 |
| $C_6H_5CH_2OC_6H_4NO_2$-4 | 48 |
| $C_6H_5CH_2OC_6H_4CO_2CH_2CH_2SCN$-2 | 76 |
| 4-$NO_2C_6H_4CH_2OC_6H_4CH_3$-3 | 51 |

Table VI summarizes tests performed as in Tables IV and V on aphis infesting nasturtium and cabbage plants.

Table VI

| Formula | Percent kill |
|---|---|
| $C_6H_5CH_2OC_6H_5$ | 14 |
| $C_6H_5CH_2OC_6H_4CH_3$-3 | 28 |
| $C_6H_5CH_2OC_6H_4CH_3$-2 | 28 |
| $C_6H_5OC_6H_4OCH_3$-2 (dilution 1:2400) | 25 |
| $C_6H_5CH_2OC_6H_4CH_2CH=CH_2$-2 | 45 |
| $C_6H_5CH_2OC_{10}H_7$-1 (dilution 1:2400) | 32 |
| $C_6H_5CH_2OC_6H_4NHCOCH_3$-4 | 66 |
| (4-$NO_2C_6H_4CH_2OC_6H_4C(CH_3)_3$ | 54 |
| 1-$C_{10}H_7CH_2OC_6H_4NO_2$-4 | 64 |
| 2-$C_{10}H_{11}CH_2OC_6H_4C(CH_3)_3$-4 (dilution 1:1600) | 41 |

Finally, Table VII gives data on fly tests conducted by the standardized procedure of the approved Peet-Grady method. In these tests a 2% solution of the indicated phenyl benzyl ether in kerosene was used.

Table VII

| Formula | Percent down | Percent dead |
|---|---|---|
| $C_6H_5CH_2OC_6H_5$ | 36 | 18 |
| $C_6H_5CH_2OC_6H_4CH(CH_3)_3$-4 | 51 | 45 |
| $C_6H_5CH_2OC_{10}H_7$-2 | 61 | 40 |
| $C_6H_5CH_2OC_6H_4C(CH_3)_3$-4 | 52 | 26 |
| $C_6H_5CH_2OC_6H_4CH_2CHC=H_2$-2 | 40 | 32 |
| $C_6H_5CH_2OC_6H_4C_6H_5$-4 | 48 | 30 |
| $C_6H_5CH_2OC_6H_4Cl$-2 | 52 | 25 |

Additional compounds that have been tested and which show a much reduced corrosiveness to plants as compared to the unsubstituted phenyl benzyl ethers without sacrifice of toxicity are:

$C_6H_5CH_2OC_6H_4CH_2C_6H_5$-4
(2-$C_6H_5CH_2O$-5-$ClC_6H_3$-)$_2S$
(2-$C_6H_5CH_2O$-5-$ClC_6H_3$-)$_2SO$
($C_6H_5CH_2OC_6H_3CH_3$-4-$NO_2$-3
$C_6H_5CH_2OC_6H_3CH_3$-2-$NO_2$-6
$C_6H_5CH_2OC_6H_3(NO_2)_2$-2,4
.5$C_6H_5CH_2OC_{10}H_6(NO_2$-1)-2
$C_6H_5CH_2OC_6H_3SO_3Na$-4-$NO_2$-2
$C_6H_5CH_2OC_6H_3(NO_2$-2)$SO_4NH_2C_6H_4CH_3$-4
2-$C_{10}H_{11}CH_2OC_6H_4NO_2$-4
(2-(4-$NO_2C_6H_4CH_2O$-)-5-$ClC_6H_3$-)$_2S$
(4-$NO_2C_6H_4CH_2OC_6H_4$-4)$_2S$
(2-(4-$NO_2C_6H_4CH_2O$-)-5-$(CH_3)_3CCH_2C(CH_3)_2C_6H_3$-)$_2S$
4-$NO_2C_6H_4CH_2OC_6H_3CH_3$-6-$(NO_2)_r$-2,4
4-$NO_2C_6H_4CH_2OC_6H_4CH_3$-2
4-$NO_2C_6H_4CH_2OC_6H_4C(CH_3)_3CH_2C(CH_3)_3$-4
4-$NO_2C_6H_4CH_2OC_6H_4CH_2C_6H_5$-4
4-$NO_2C_6H_4CH_2OC_{10}H_7$-2
4-$NO_2C_6H_4CH_2OC_6H_4COC_6H_5$
$C_6H_5CH_2OC_6H_4NH_2$-4.HCl
$C_6H_5CH_2OC_6H_4NHCH_3C_6H_5$-4
$C_6H_5CH_2OC_6H_3CH_2N(CH_3)_2$-2-$C_8H_{17}$-4
$C_6H_5CH_2OC_6H_4NH_2$-4-SCN-3
$C_6H_5CH_2OC_6H_4C(=NOH)C_6H_5$-4
($C_6H_5CH_2OC_6H_4CO_2$-)$_2Cu$-2
$C_6H_5CH_2OC_6H_4CO_2CH_2CH_2Cl$-2
$C_6H_5CH_2OC_6H_3$-4-$CH_3$-2-$COC_6H_4$-2'-$CO_2CH_2C_6H_5$
($C_6H_5CH_2OC_6H_3$-4-$CH_3$-2-$COC_6H_4$-2'-$CO_2$-)$_2Cu$
$C_6H_5CH_2OC_6H_4SO_3Na$-4
$C_6H_5CH_2OC_6H_4SO_3NH(CH_3)_2C_6H_4SCN$-4
$C_6H_5CH_2OC_6H_4HgO_2CCH_3$
(4-$C_6H_5CH_2OC_6H_4$-)$_2SO_2$
$C_6H_5CH_2OC_6H_4SO_2NH_2$-4
$C_6H_5CH_2OC_6H_4SO_2NHC_2H_5$-4
(4-$C_6H_5CH_2OC_6H_4$-)$_2SO$
(4-$C_6H_5CH_2OC_6H_4$-)$_2S$
4-$C_6H_5CH_2OC_6H_4SCH_2C_6H_5$
$C_6H_5CH(OC_6H_5)_2$
($C_6H_5)_2C(OC_6H_5)_2$
(2-$C_6H_5CH_2OC_6H_4CO_r$-)$_2Cu$
(2-$C_6H_5CH_2OC_6H_4CO_2$-)$_2Zn$
$C_6H_5CH_2OC_6H_4CO_2CH_2CH_2Cl$
2-$C_6H_5CH_2OC_6H_4CONHC_6H_5$
2-$C_6H_5CH_2OC_6H_4CONH_2$

From the data herein contained it is apparent that those phenyl benzyl ethers having a substantially neutral substituent of atomic or relative group weight of at least 30 or less corrosive to plants than the unsubstituted or less highly substituted ones. Also that they have a wide range of usefulness in combating insect pests. Additional substituent groups and other ways of using those herein disclosed will be apparent to persons skilled in the art. It is intended that such modifications as do not depart from the basic concept of the invention are to be included in the appended claims.

I claim:
1. An agricultural insecticidal composition suitable for use on living plants which contains a phenyl benzyl ether of the general formula

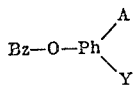

wherein Bz represents a benzyl group, Ph represents a phenyl nucleus, Y represents a member of the group consisting of hydrogen, aliphatic hydrocarbon groups, and nitro groups, and A represents a neutral substituent selected from the group consisting of salts, esters, and amides of the —COOH and —SO₃H groups.

2. An agricultural insecticidal composition suitable for use on living plants which contains a phenyl benzyl ether of the formula

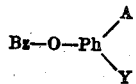

wherein Bz represents a benzyl group, Ph represents a phenyl nucleus, Y represents hydrogen, and A represents a neutralized carboxyl group.

3. An agricultural insecticidal composition suitable for use on living plants containing a phenyl benzyl ether that is phenyl substituted by a methyl ester of a carboxyl group.

4. An insecticidal composition containing the benzyl ether of 2-hydroxy methyl benzoate.

5. An agricultural insecticidal composition suitable for use on living plants which contains a phenyl benzyl ether of the formula

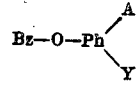

wherein Bz represents a benzyl group, Ph represents a phenyl nucleus, Y represents hydrogen, and A represents a neutralized sulfonic group.

WILLIAM F. HESTER.